(12) United States Patent
Kamiyama et al.

(10) Patent No.: US 8,810,186 B2
(45) Date of Patent: Aug. 19, 2014

(54) MOTOR DRIVE DEVICE, TIMEPIECE DEVICE, AND ELECTRONIC DEVICE

(75) Inventors: Shotaro Kamiyama, Chiba (JP); Kenji Ogasawara, Chiba (JP); Saburo Manaka, Chiba (JP); Keishi Honmura, Chiba (JP); Kazumi Sakumoto, Chiba (JP); Hiroshi Shimizu, Chiba (JP); Kosuke Yamamoto, Chiba (JP)

(73) Assignee: Seiko Instruments Inc. (JP)

( * ) Notice: Subject to any disclaimer, the term of this patent is extended or adjusted under 35 U.S.C. 154(b) by 321 days.

(21) Appl. No.: 13/374,772

(22) Filed: Jan. 12, 2012

(65) Prior Publication Data

US 2012/0182840 A1 Jul. 19, 2012

(30) Foreign Application Priority Data

Jan. 17, 2011 (JP) .................................. 2011-007271
Nov. 9, 2011 (JP) .................................. 2011-245201

(51) Int. Cl.
*H02P 8/38* (2006.01)
*H02P 8/02* (2006.01)

(52) U.S. Cl.
CPC ....................................... *H02P 8/02* (2013.01)
USPC ............ 318/696; 318/685; 318/671; 318/560

(58) Field of Classification Search
CPC ......................................................... H02P 8/02
USPC .................................. 318/696, 685, 671, 560
See application file for complete search history.

(56) References Cited

U.S. PATENT DOCUMENTS 7,154,816 B2 * 12/2006 Igarashi et al. .................. 368/66

FOREIGN PATENT DOCUMENTS

JP 62238484 10/1987

* cited by examiner

*Primary Examiner* — David Luo
(74) *Attorney, Agent, or Firm* — Adams & Wilks

(57) ABSTRACT

A motor drive device includes a charging detection and reverse current prevention portion and a pulse selection control portion. The charging detection and reverse current prevention portion detects a charging state of a secondary battery that is charged by an electromotive force of a solar battery, the charging state indicating whether the secondary battery is being charged. The pulse selection control portion causes a first drive pulse for driving a motor to be generated and, in a case where the charging state that is detected by the charging detection and reverse current prevention portion is different after the first drive pulse has been output from what it was before the first drive pulse was output, causes a second drive pulse for driving the motor to be generated.

20 Claims, 10 Drawing Sheets

MOTOR DRIVE DEVICE, TIMEPIECE DEVICE, AND ELECTRONIC DEVICE

BACKGROUND OF THE INVENTION

1. Field of the Invention

The present invention relates to a motor drive device, a timepiece device, and an electronic device.

2. Description of the Related Art

An electronic timepiece (a timepiece device) that uses a solar battery or the like as a primary power supply portion is generally known. This sort of electronic timepiece may be, for example, an analog electronic timepiece that uses voltage that is generated by the primary power supply portion to charge a secondary battery (a secondary power supply portion), and that then uses the charged power of the secondary battery to output a motor drive pulse from a timepiece circuit and rotationally drive a motor that operates the hands of the timepiece.

With this sort of electronic timepiece, the output voltage of the solar battery varies drastically according to the intensity of the sunlight, causing the power supply voltage to applied to the timepiece circuit to vary, so the operation of the timepiece circuit sometimes becomes unstable. Accordingly, as disclosed in Japanese Patent Application Publication No. JP-A 62-238484, for example, the power supply voltage for the timepiece circuit may be detected before the motor is driven, a determination may be made as to whether the power supply voltage that is applied to the timepiece circuit is a high voltage or a low voltage, and a suitable pulse width may be selected according to the result of the high voltage/low voltage determination.

However, with the technology that is described in Japanese Patent Application Publication No. JP-A 62-238484, the problems hereinafter described occur. Specifically, with this technology, the power supply voltage for the timepiece circuit is detected before the motor is driven, and the motor drive pulse (a pulse for high voltage or a pulse for low voltage) is selected. Therefore, in a case where the power supply voltage for the timepiece circuit changes suddenly while the motor is being driven, due to a change in the charging state when charging of the secondary battery starts or stops, the possibility exists that the selected motor drive pulse will become unsuitable, that the motor will not rotate, or the like, causing a malfunction in the motor.

In a case where the non-rotation of the motor is detected by a rotation detection technology, it is conceivable that the time error that is caused by the non-rotation of the motor will be corrected by causing the motor to rotate using a drive pulse that has a sufficient width for driving the motor reliably. However, this sort of rotation detection technology detects the rotation/non-rotation of the motor based on the waveform of the voltage that is output to the motor terminal after the drive pulse is output, and it assumes that the variation in the voltage will be comparatively gradual. Therefore, this sort of rotation detection technology is unable to function properly in a situation where the voltage changes suddenly, as it does when the charging of the secondary battery starts or stops in a case where a solar battery or the like is used.

In other words, with the two technologies described above, a problem exists in that the motor cannot operate reliably in a case where the power supply voltage changes suddenly while the motor is being driven, due to a change in the charging state of the secondary battery.

SUMMARY OF THE INVENTION

It is an aspect of the present application to provide a motor drive device, a timepiece device, and an electronic device that are able to drive the motor reliably even in a case where the power supply voltage changes suddenly while the motor is being driven, due to a change in the charging state of the secondary battery (the secondary power supply portion).

According to another aspect of the present application, there is provided a motor drive device that includes a charging detection portion and a control portion. The charging detection portion detects a charging state of a secondary power supply portion that is charged by an electromotive force of a primary power supply portion, the charging state indicating whether the secondary power supply portion is being charged. The control portion causes a first drive pulse for driving a motor to be generated and, in a case where the charging state that is detected by the charging detection portion is different after the first drive pulse has been output from what it was before the first drive pulse was output, causes a second drive pulse for driving the motor to be generated.

According to another aspect of the present application, in the motor drive device, the second drive pulse may be a drive pulse that has a wider pulse width than does the first drive pulse.

According to another aspect of the present application, in the motor drive device, the second drive pulse may be a drive pulse that has a pulse width that is necessary and sufficient for rotating the motor.

According to another aspect of the present application, the motor drive device may also include a battery voltage detection portion that detects an output voltage of the secondary power supply portion, and the control portion may also modify the pulse width of the first drive pulse based on a detection result from the battery voltage detection portion.

According to another aspect of the present application, in the motor drive device, the control portion may modify the pulse width of the first drive pulse based on the output voltage that is detected by the battery voltage detection portion and on a predetermined switching point. The control portion may also not cause the second drive pulse to be generated in a case where the output voltage that is detected by the battery voltage detection portion does not pass through the predetermined switching point during the time from before the first drive pulse is output to after the first drive pulse is output.

According to another aspect of the present application, in the motor drive device, the primary power supply portion may be a solar battery.

According to another aspect of the present application, there is provided a timepiece device that includes the motor drive device that is described above.

According to another aspect of the present application, there is provided an electronic device that includes the motor drive device that is described above.

According to the present application, the motor can be driven reliably, even if the charging state of the secondary power supply portion changes during the driving of the motor and the power supply voltage changes suddenly.

DETAILED DESCRIPTION OF THE INVENTION

Hereinafter, an electronic device (for example, a timepiece device) that is provided with a motor drive device according to an embodiment of the present invention will be described with reference to the drawings.

First Embodiment

Figure 1:
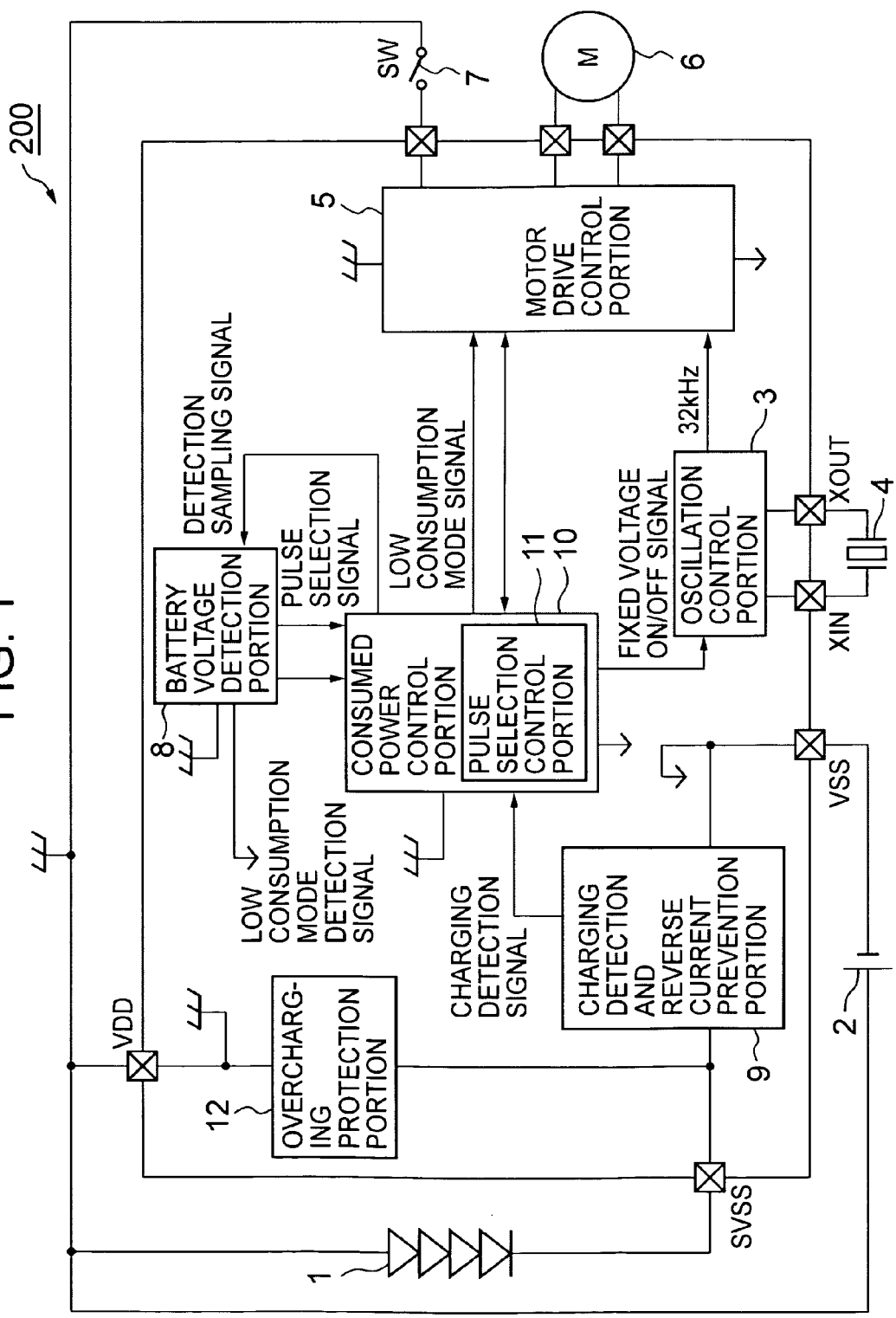
FIG. 1 is a schematic block diagram that shows a configuration of a timepiece device that is provided with a motor drive device according to an embodiment of the present invention.

FIG. 1 is a schematic block diagram that shows a configuration of a timepiece device (hereinafter called the timepiece) that is provided with a motor drive device according to an embodiment of the present invention.

In FIG. 1, a timepiece 200 is provided with a solar battery 1, a secondary battery 2, and a motor drive device 100. Further, the motor drive device 100 is provided with an oscillation control portion 3, a crystal oscillator 4, a motor drive control portion 5, a motor 6 for the time (for the timepiece hands), a switch (SW) 7, a battery voltage detection portion 8, a charging detection and reverse current prevention portion 9, a consumed power control portion 10, a pulse selection control portion 11, and an overcharging protection portion 12. The timepiece 200 may be an analog display type of electronic timepiece, for example, and the motor 6 for the timepiece hands may be a step motor.

Hereinafter, the functions of the various portions of the timepiece 200 will be explained in order with reference to FIG. 1.

In the solar battery 1 (a primary power supply portion), the positive terminal is connected to a power supply line VDD, and the negative terminal is connected to a power supply line SVSS. The negative terminal of the solar battery 1 is also connected to the charging detection and reverse current prevention portion 9. The solar battery 1 generates electromotive force from sunlight. The solar battery 1 charges the secondary battery 2 through the charging detection and reverse current prevention portion 9. The solar battery 1 also supplies electric power to the various portions of the timepiece 200 through the power supply line VDD. Note that the power supply line VDD is a VDD ground and indicates the reference potential of the entire timepiece 200.

In the secondary battery 2 (a secondary power supply portion), the positive terminal is connected to the power supply line VDD, and the negative terminal is connected to a power supply line VSS. The negative terminal of the secondary battery 2 is also connected to the charging detection and reverse current prevention portion 9. The secondary battery 2 is charged by the electromotive force of the solar battery 1 through the charging detection and reverse current prevention portion 9. The secondary battery 2 also supplies electric power to the various portions of the timepiece 200 through the power supply line VDD.

The oscillation control portion 3 is connected to the crystal oscillator 4 and generates by oscillation a basic timepiece signal that is used for measuring the time. The oscillation control portion 3 performs control of the oscillation operation for the basic timepiece signal based on a fixed voltage on/off signal that is supplied from the consumed power control portion 10. In a case where the fixed voltage on/off signal is an H (high) state, for example, the oscillation control portion 3 stops the oscillation for the basic timepiece signal. In a case where the fixed voltage on/off signal is an L (low) state, for example, the oscillation control portion 3 performs the oscillation for the basic timepiece signal.

The oscillation control portion 3 supplies the generated basic timepiece signal to the motor drive control portion 5. The frequency of the basic timepiece signal that is generated by the oscillation control portion 3 may be 32.768 kHz, for example. The crystal oscillator 4 is connected to the oscillation control portion 3 and is used for the oscillation of the basic timepiece signal.

Based on the basic timepiece signal that is supplied from the oscillation control portion 3, the motor drive control portion 5 controls the timepiece operation that measures the time. The timepiece operation includes an operation that drives the motor (M) 6 that operates the hands of the timepiece 200 that display the time. That is, the motor drive control portion 5 controls the driving of the motor 6 by supplying a specified drive pulse to the motor 6.

The motor drive control portion 5 is also connected to the pulse selection control portion 11 of the consumed power control portion 10 through a control signal line. Through the control signal line, the motor drive control portion 5 outputs to the pulse selection control portion 11 a drive timing signal that is output once per second and a pulse completed signal that indicates that the supplying of the drive pulse to the motor 6 has been completed. Through the control signal line, the motor drive control portion 5 is also supplied with a pulse generation request signal from the pulse selection control portion 11.

Figure 2:
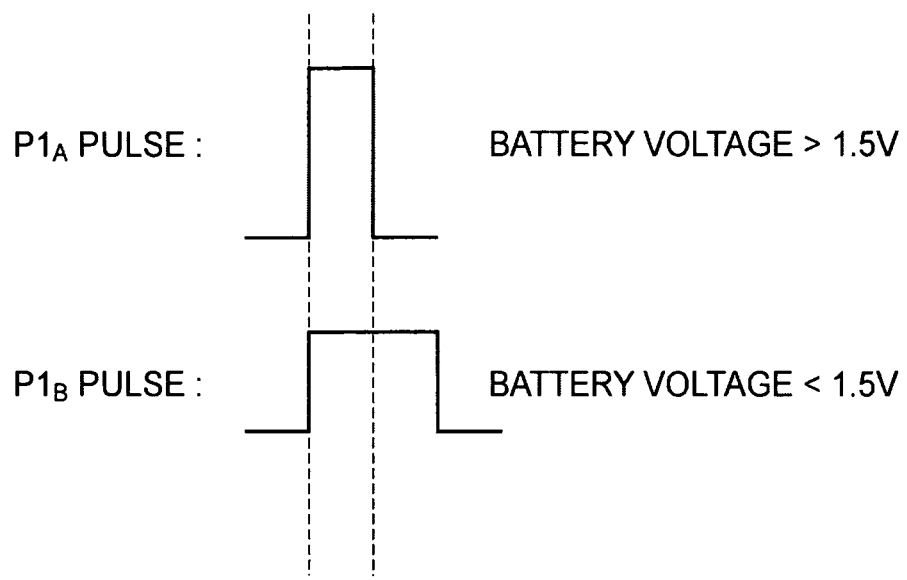
FIG. 2 is a waveform diagram that shows a first drive pulse that is supplied to a motor.

Next, the drive pulse that is supplied to the motor 6 will be explained with reference to FIG. 2. FIG. 2 is a waveform diagram that shows a first drive pulse that is supplied to the motor 6.

In the present embodiment, three types of drive pulses are used as the drive pulse that is supplied to the motor 6. Specifically, the first drive pulse and a second drive pulse are used. The first drive pulse consumes little power and is used mainly to drive the motor 6. The second drive pulse is a drive pulse for correcting the time and has the pulse width that is necessary and sufficient for driving the motor 6 reliably.

The first drive pulse is divided into two types, a $P1_A$ pulse and a $P1_B$ pulse, that have different pulse widths, such that they can be compatible with the solar-powered electricity generation, for which the amplitude of the fluctuation in the voltage is large. As will be described later, the $P1_A$ pulse and the $P1_B$ pulse are switched according to the output voltage of the secondary battery 2. In other words, the pulse widths of the first drive pulse are changed based on the detection result of the battery voltage detection portion 8, which detects the output voltage of the secondary battery 2.

Specifically, the motor drive control portion 5 uses the $P1_A$ pulse in a case where the output voltage of the secondary battery 2 is not less than a predetermined switching point CT (for example, 1.5 volts) and uses the $P1_B$ pulse in a case where the output voltage is less than 1.5 volts. Therefore, as shown in FIG. 2, the $P1_A$ pulse is set such that the pulse width is shorter and the pulse height is higher than for the $P1_B$ pulse, and the $P1_B$ pulse is set such that the pulse width is longer and the pulse height is lower than for the $P1_A$ pulse. Note that for both the $P1_A$ pulse and the $P1_B$ pulse, the pulse width is the minimum that makes it possible to drive the motor 6 in accordance with the output voltage of the secondary battery 2. This makes it possible for the timepiece 200 and the motor drive device 100 to reduce the amount of power they consume.

In the present embodiment, the second drive pulse is a P2 pulse that has a pulse width that is significantly longer than those of the $P1_A$ pulse and the $P1_B$ pulse.

The P2 pulse is a drive pulse that has a pulse width that is wider than that of the first drive pulse (the $P1_A$ pulse or the $P1_B$ pulse). In other words, the P2 pulse is a drive pulse that has a pulse width that is not less than what is necessary and sufficient for driving the motor 6. That is, the P2 pulse is a corrected drive pulse with a pulse width that has an effective value that makes it sufficient for driving the motor 6.

Figure 3:
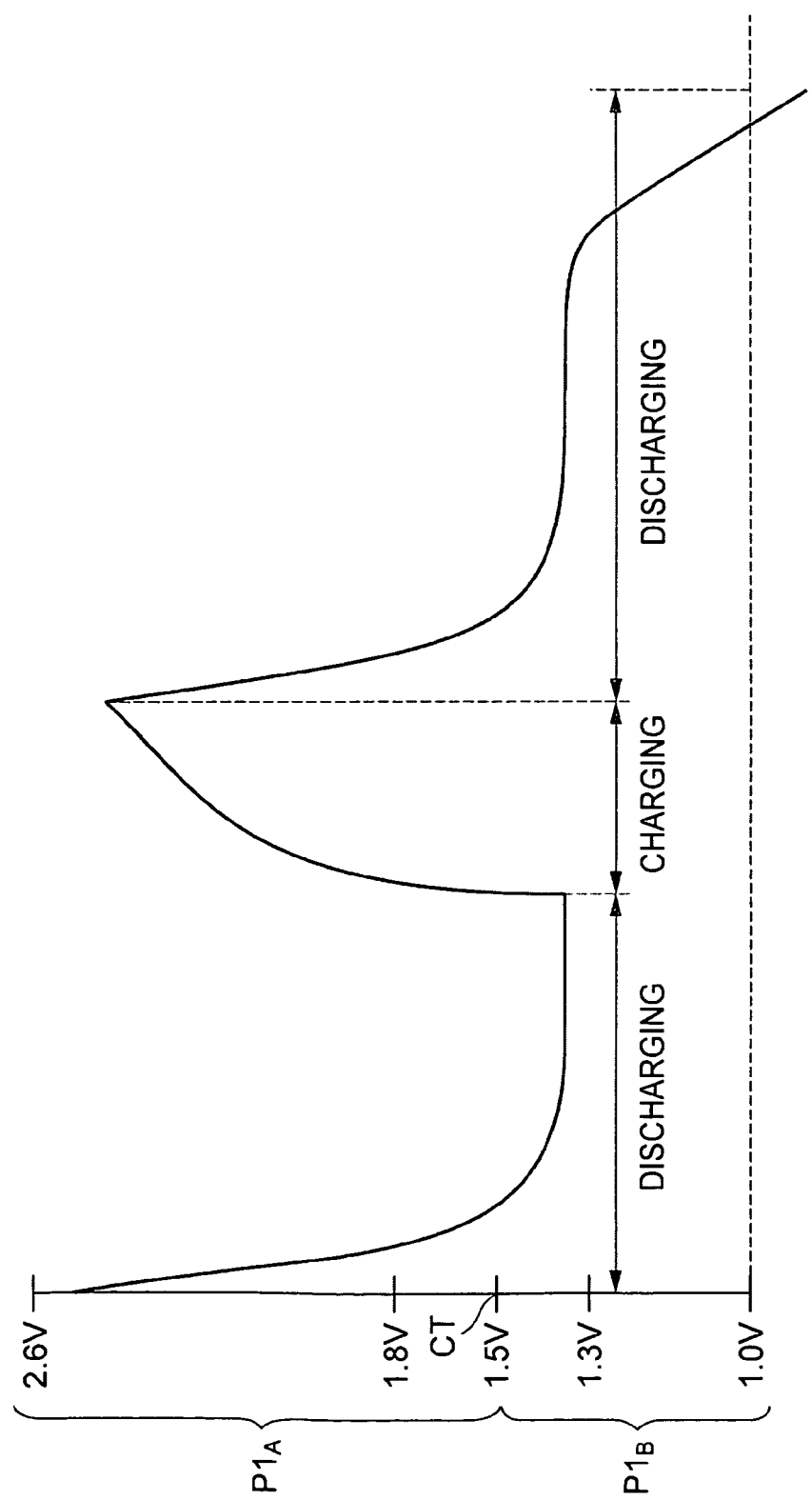
FIG. 3 is a waveform diagram that shows an output voltage of a secondary battery.

Next, the switching point CT will be explained with reference to FIG. 3. FIG. 3 is a waveform diagram that shows the output voltage of the secondary battery 2.

As shown in FIG. 3, the secondary battery 2 repeatedly discharges (consumes power) and charges, with the output voltage at full charge being not less than 1.8 to 2.6 volts, the average output voltage being 1.3 to 1.4 volts, and the output voltage in a stopped state being 1.0 volt. In addition, an output voltage of 1.5 volts, for example, is set in advance as the switching point CT. In other words, the switching point CT is the output voltage point of the secondary battery 2 for switching between the drive method that uses the $P1_A$ pulse as the drive pulse for the motor 6 and the drive method that uses the $P1_B$ pulse.

The motor drive control portion 5 is provided with a pulse generation portion that generates the $P1_A$ pulse, the $P1_B$ pulse, and the P2 pulse that are described above. The pulse generation portion may be configured from software using a CPU, and it may be configured from hardware using only a logic circuit. The motor drive control portion 5 receives the pulse generation request signal that is output from the pulse selection control portion 11, causes one of the $P1_A$ pulse, the $P1_B$ pulse, and the P2 pulse to be generated from the pulse generation portion, and supplies the generated pulse to the motor 6. After supplying the one of the $P1_A$ pulse, the $P1_B$ pulse, and the P2 pulse to the motor 6, the motor drive control portion 5 outputs the pulse completed signal to the pulse selection control portion 11.

The motor drive control portion 5 also shifts the timepiece 200 into a low consumption mode based on a low consumption mode signal that is supplied from the consumed power control portion 10. Specifically, in a case where the low consumption mode signal is in the H state, the motor drive control portion 5 shifts the timepiece 200 into the low consumption mode. Furthermore, in a case where the low consumption mode signal is in the L state, the motor drive control portion 5 shifts the timepiece 200 from the low consumption mode into a normal operation mode.

The motor drive control portion 5 also detects the rotation of the motor 6 and determines whether or not the timepiece hands are being operated properly (rotation detection technology). In a case where the motor drive control portion 5 determines that the timepiece hands are not being operated properly, the motor drive control portion 5 drives the motor 6 once again, such that the hands of the timepiece indicate the correct time.

Upon receiving the drive pulse that is supplied from the motor drive control portion 5, the motor 6 rotationally drives a rotor to operate the hands of the timepiece 200. That is, the motor 6 is a timing motor that measures the time. The motor 6 is a motor that stops the rotor at a fixed position and that normally rotates only 180 degrees in a single operation. The drive torque that drives the motor 6 is determined by the voltage and the pulse width of the drive pulse. In a case where the drive torque that is determined by the first drive pulse is too small, the motor 6 might not be able to rotate 180 degrees. Conversely, in a case where the drive torque that is determined by the first drive pulse is too great, the rotational force might be too strong, such that the motor 6 rebounds from the 180-degree rotation position and returns to the position where it was originally before it rotated.

Furthermore, in a case where the motor 6 is driven by the P2 pulse, even after the motor 6 has rotated to the 180-degree rotation position, the drive torque is applied, and the 180-degree rotation position is maintained. Therefore, the motor 6 is reliably rotated 180 degrees by the P2 pulse, and does not return to the position where it was originally before it rotated. Note that the reason why the hands of the timepiece 200 are not always operated using the P2 pulse is that with the P2 pulse, a larger amount of power is consumed.

One terminal of the switch 7 is connected to the motor drive control portion 5, and the other terminal is connected to the power supply line VDD. The switch 7 is the crown switch of the timepiece 200. In a case where the crown is pulled out from the timepiece 200, the switch 7 enters a conductive state, for example, and in a case where the crown is pushed into the timepiece 200, the switch 7 enters a non-conductive state, for example. In a case where the crown is pulled out, the operating of the hands of the timepiece 200 stops, and the timepiece 200 enters a state in which the time can be set. In other words, in a case where the switch 7 is in the conductive state, the motor drive control portion 5 stops the driving of the motor 6.

Using a detection sampling signal that is supplied by the consumed power control portion 10 as a trigger, the battery voltage detection portion 8 detects the output voltage (the output potential difference) of the secondary battery 2. If the battery voltage detection portion 8 detects a state in which the output voltage of the secondary battery 2 is less than a predetermined threshold value, the battery voltage detection portion 8 outputs a low consumption mode detection signal to the consumed power control portion 10 as a detection result. Specifically, in a case where the output voltage of the secondary battery 2 is less than the predetermined threshold value, the low consumption mode detection signal is in the H state, and in a case where the output voltage of the secondary battery 2 is not less than the predetermined threshold value, the low consumption mode detection signal is in the L state. Note that the predetermined threshold value is a value that exceeds the lowest voltage that is able to drive the motor 6 by a predetermined voltage.

The battery voltage detection portion 8 also detects whether or not the output voltage of the secondary battery 2 is not less than the predetermined switching point CT (for example, 1.5 volts), and outputs to the pulse selection control portion 11 a pulse selection signal that corresponds to the detection result. Specifically, in a case where the output voltage of the secondary battery 2 is not less than the predetermined switching point CT (for example, 1.5 volts), the pulse selection signal is in the H state, for example, and in a case where the output voltage is less than the predetermined switching point CT, the pulse selection signal is in the L state, for example.

The charging detection and reverse current prevention portion 9 (a charging detection portion) detects a charging state of the secondary battery 2. What is here called the charging state is a state that indicates whether or not the secondary battery 2 is being charged. Specifically, the charging detection and reverse current prevention portion 9 may detect, for example, a non-charging state that indicates that the output voltage (the output potential difference) of the solar battery 1 is not greater than the output voltage (the output potential difference) of the secondary battery 2. In a case where the charging detection and reverse current prevention portion 9 has detected the non-charging state, the charging detection and reverse current prevention portion 9 outputs a charging detection signal to the consumed power control portion 10 as a detection result. In a case where the non-charging state has been detected, the charging detection signal is in the H state. In a case where a charging state has been detected that indicates a state in which the output voltage of the solar battery 1 is greater than the output voltage of the secondary battery 2, the charging detection signal is in the L state.

Figure 4:
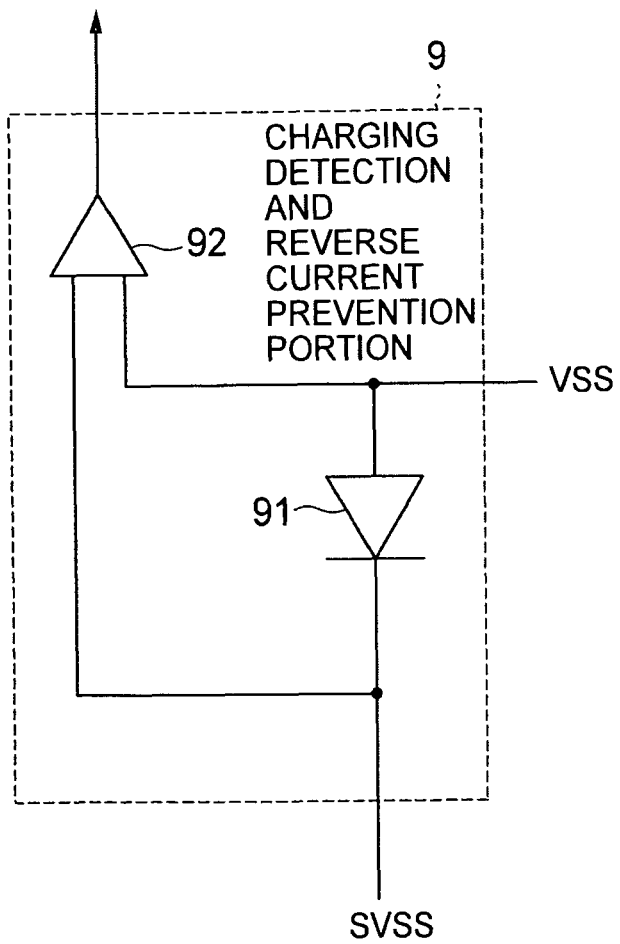
FIG. 4 is a circuit diagram that shows a detailed configuration of a charging detection and reverse current prevention portion.

FIG. 4 is a circuit diagram that shows a detailed configuration of the charging detection and reverse current prevention portion 9.

As shown in FIG. 4, the charging detection and reverse current prevention portion 9 is configured from a diode 91 and a comparator 92. The anode side of the diode 91 is connected to the power supply line VSS, and the cathode side is connected to the power supply line SVSS. The charging detection and reverse current prevention portion 9 uses this configuration to prevent an electric current from flowing in reverse from the secondary battery 2 to the solar battery 1 in a case where the generated voltage of the solar battery 1 is less than the battery voltage of the secondary battery 2.

One input terminal of the comparator 92 is connected to the power supply line SVSS, which is connected to the negative terminal of the solar battery 1, and another input terminal is connected to the power supply line VSS, which is connected to the negative terminal of the secondary battery 2. The output of the comparator 92 is the charging detection signal. In a case where the output voltage of the solar battery 1 is not greater than the output voltage of the secondary battery 2 (the case of the non-charging state), the comparator 92 outputs the H state as the charging detection signal to the consumed power control portion 10. In a case where the output voltage of the solar battery 1 is greater than the output voltage of the secondary battery 2, the comparator 92 outputs the L state as the charging detection signal to the consumed power control portion 10.

Based on the detection result (the low consumption mode detection signal) from the battery voltage detection portion 8, the consumed power control portion 10 determines whether or not the output voltage of the secondary battery 2 is not greater than the predetermined threshold value that is described above. In addition, based on the detection result (the charging detection signal) from the charging detection and reverse current prevention portion 9, the consumed power control portion 10 determines whether or not the non-charging state exists that indicates that the output voltage of the solar battery 1 is not greater than the output voltage of the secondary battery 2. Based on the low consumption mode detection signal and the charging detection signal, the consumed power control portion 10 shifts the timepiece 200 to the low consumption mode.

The low consumption mode may be, for example, a state in which the motor drive control portion 5 stops the driving of the motor 6, and the oscillation control portion 3 stops the output of the basic timepiece signal. Therefore, in a case where the consumed power control portion 10 shifts the timepiece 200 to the low consumption mode, the consumed power control portion 10 causes the motor drive control portion 5 to stop the timepiece operation (the operating of the timepiece hands by the motor 6). In the case where the consumed power control portion 10 shifts the timepiece 200 to the low consumption mode, the consumed power control portion 10 also causes the oscillation control portion 3 to stop the oscillation of the basic timepiece signal.

Furthermore, in a case where the non-charging state does not exist, based on the charging detection signal, the consumed power control portion 10 shifts the timepiece 200 from the low consumption mode to the normal operation mode, in which the timepiece operation is performed. The normal operation mode is the state in which the oscillation control portion 3 outputs the basic timepiece signal, and the motor drive control portion 5 performs the driving of the motor 6.

In addition, the consumed power control portion 10 supplies the detection sampling signal to the battery voltage detection portion 8 as the trigger signal for detecting the output voltage of the secondary battery 2. The consumed power control portion 10 also supplies the fixed voltage on/off signal to the oscillation control portion 3 and supplies the low consumption mode signal to the motor drive control portion 5. The consumed power control portion 10 uses the fixed voltage on/off signal and the low consumption mode signal to perform control that shifts the timepiece 200 from the normal operation mode to the low consumption mode and to perform control that shifts the timepiece 200 from the low consumption mode to the normal operation mode.

Further, the consumed power control portion 10 is provided with the pulse selection control portion 11.

Based on the drive timing signal, the pulse selection control portion 11 (a control portion) outputs the pulse generation request signal to the motor drive control portion 5, such that one of the $P1_A$ pulse and the $P1_B$ pulse will be generated at the specified timing (once per second) for driving the motor 6. Specifically, when the drive timing signal is supplied from the motor drive control portion 5, the pulse selection control portion 11 refers to the pulse selection signal from the battery voltage detection portion 8. Then, in a case where the pulse selection signal is the H state, that is, in a case where the output voltage of the secondary battery 2 is not less than the switching point CT (for example, 1.5 volts), the pulse selection control portion 11 outputs the pulse generation request signal to the motor drive control portion 5, such the $P1_A$ pulse will be generated as the drive pulse for the motor 6. In a case where the pulse selection signal is the L state, that is, in a case where the output voltage of the secondary battery 2 is less than 1.5 volts, the pulse selection control portion 11 outputs the pulse generation request signal to the motor drive control portion 5, such the $P1_B$ pulse will be generated as the drive pulse for the motor 6.

Next, based on the detection result of the charging detection and reverse current prevention portion 9, which detects the charging state of the secondary battery 2, the pulse selection control portion 11 compares the charging before the one of the $P1_A$ pulse and the $P1_B$ pulse was output and the charging after the one of the $P1_A$ pulse and the $P1_B$ pulse was output. Then, in a case where the charging before the one of the $P1_A$ pulse and the $P1_B$ pulse was output is different from the charging after the one of the P1$_A$ pulse and the P1$_B$ pulse was output, the pulse selection control portion 11 generates the P2 pulse for driving the motor 6.

Specifically, the pulse selection control portion 11 monitors the charging detection signal, and based on the result, it outputs the pulse generation request signal to the motor drive control portion 5 such that the P2 pulse will be generated as the drive pulse for the motor 6. In other words, the pulse selection control portion 11 examines the states (the H state/ the L state) of the charging detection signal both before and after the request is issued to generate the one of the P1$_A$ pulse and the P1$_B$ pulse, and if the states are different, the pulse selection control portion 11 outputs the pulse generation request signal such that the P2 pulse is generated. The operation with respect to this point will be described in detail later. Note that the pulse selection control portion 11 detects the charging state (the state of the charging detection signal) after the request is issued to generate the one of the P1$_A$ pulse and the P1$_B$ pulse based on the pulse completed signal that is supplied from the motor drive control portion 5.

The overcharging protection portion 12 also detects the output voltage (the generated voltage) of the solar battery 1. In a case where the generated voltage of the solar battery 1 that has been detected is not less than a specified threshold value (a case where the generated voltage is too great), the overcharging protection portion 12 short circuits the generating side in order to avoid overcharging of the secondary battery 2.

Next, the operation of the present embodiment will be explained.

Figure 5:
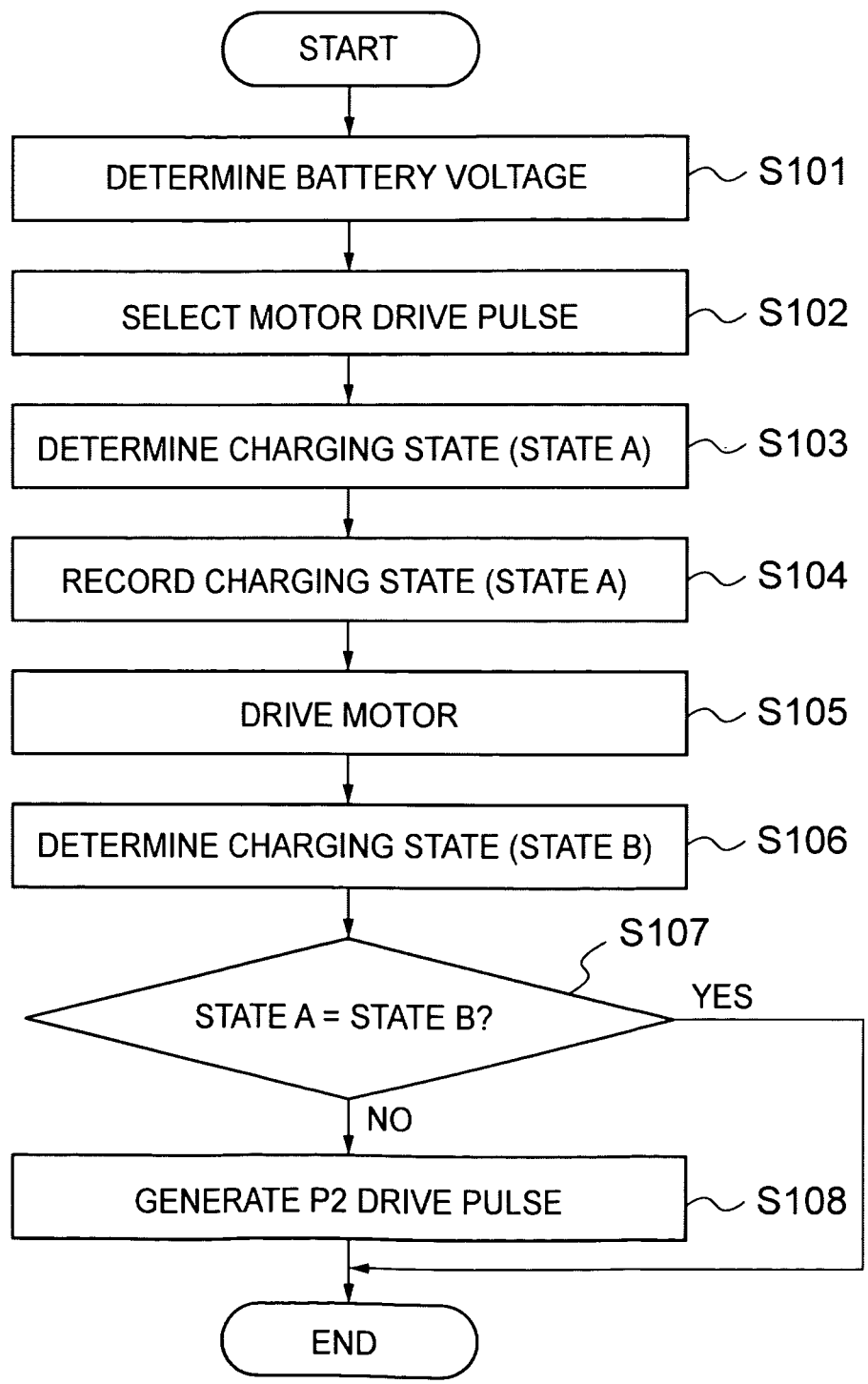
FIG. 5 is a flowchart that shows pulse selection control processing according to the present embodiment.

FIG. 5 is a flowchart that shows pulse selection control processing according to the present embodiment.

First, the pulse selection control portion 11 determines whether or not the output voltage of the secondary battery 2 is not less than the switching point CT (for example, 1.5 volts), based on the state (the H state/the L state) of the pulse selection signal that is supplied from the battery voltage detection portion 8 (Step S101). Note that the pulse selection control portion 11 performs the processing at Step S101 based on the drive timing signal that is supplied from the motor drive control portion 5.

Next, based on the determination result at Step S101, the pulse selection control portion 11 selects one of the P1$_A$ pulse and the P1$_B$ pulse as the drive pulse for the motor 6 (Step S102). Specifically, in a case where the output voltage of the secondary battery 2 is not less than 1.5 volts (the state of the pulse selection signal is the H state), the pulse selection control portion 11 outputs the pulse generation request signal to the motor drive control portion 5 such that the P1$_A$ pulse will be generated as the drive pulse for the motor 6. In a case where the output voltage of the secondary battery 2 is less than 1.5 volts (the state of the pulse selection signal is the L state), the pulse selection control portion 11 outputs the pulse generation request signal to the motor drive control portion 5 such that the P1$_B$ pulse will be generated as the drive pulse for the motor 6.

Next, the pulse selection control portion 11 determines the charging/non-charging state of the secondary battery 2, based on the state (the H state/the L state) of the charging detection signal that is output from the charging detection and reverse current prevention portion 9 (Step S103). Then the determination result at this time is stored in memory as a state A (Step S104). Thereafter, the motor drive control portion 5 drives the motor 6 by outputting to the motor 6 the one of the P1$_A$ pulse and the P1$_B$ pulse that was selected at Step S102 (Step S105).

After the motor 6 is driven, the pulse selection control portion 11 once again determines the charging/non-charging state of the secondary battery 2, based on the state (the H state/the L state) of the charging detection signal (Step S106). The determination result at this time is defined as a state B. Note that the pulse selection control portion 11 performs the processing at Step S106 after detecting that the motor 6 has been driven based on the pulse completed signal that is supplied from the motor drive control portion 5. In this manner, the pulse selection control portion 11 determines the charging/non-charging state of the secondary battery 2 before and after the driving of the motor 6. Then the pulse selection control portion 11 compares the state A and the state B that are the determination results (Step S107).

If the result of the comparison is that the state A and the state B are the same, the pulse selection control processing is terminated, and if the result of the comparison is that the state A and the state B are different, the pulse selection control portion 11 outputs the pulse generation request signal to the motor drive control portion 5 such that the P2 pulse will be generated as the drive pulse for the motor 6 (Step S108), and the pulse selection control processing is terminated.

Next, the pulse selection control according to the present embodiment, as the state of the timepiece 200 passes from a voltage drop due to power consumption, through a voltage increase due to the charging, to another voltage drop due to power consumption, will be explained with reference to FIG. 6.

Figure 6:
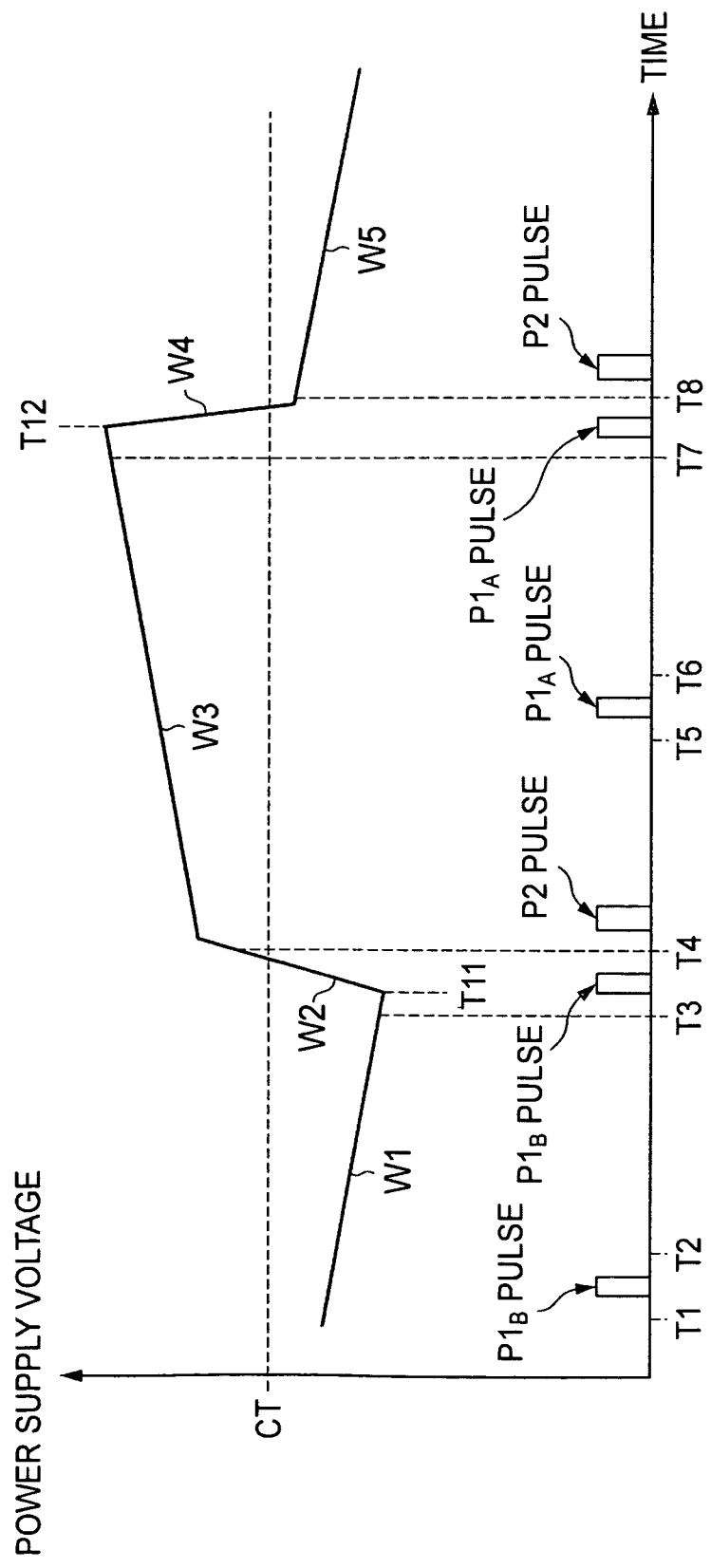
FIG. 6 is a timing chart that shows an example of the operation of the pulse selection control according to the present embodiment.

FIG. 6 is a timing chart that shows an example of the operation of the pulse selection control according to the present embodiment. Note that in FIG. 6, the horizontal axis indicates the time, and the vertical axis indicates the power supply voltage. Further, the P1$_A$ pulse and the P1$_B$ pulse that are shown in FIG. 6 are supplied to the motor 6 once per second.

First, from a time T1 to close to a time T3, the output voltage (the power supply voltage) of the secondary battery 2, as indicated by W1 in FIG. 6, gradually decreases from a voltage that is lower than the switching point CT (for example, 1.5 volts), due to the voltage drop that is caused by power consumption.

At the time T1, the output voltage of the secondary battery 2 is a voltage that is lower than the switching point CT, so the pulse selection signal that is output from the battery voltage detection portion 8 is the L state. Based on the state of the pulse selection signal, the pulse selection control portion 11 determines that the output voltage of the secondary battery 2 is in a state of being lower than the switching point CT (Step S101 in FIG. 5). In accordance with this determination, the pulse selection control portion 11 outputs the pulse generation request signal to the motor drive control portion 5 such that the P1$_B$ pulse will be generated as the drive pulse for the motor 6 (Step S102).

At the time T1, the secondary battery 2 is also not being charged, so the charging detection signal from the charging detection and reverse current prevention portion 9 is in the H state, and the pulse selection control portion 11 determines that the secondary battery 2 is in the non-charging state (Step S103). The determination result (state A) is stored in the memory of the pulse selection control portion 11 (Step S104).

After the time T1, the motor drive control portion 5 generates the P1$_B$ pulse as the drive pulse for the motor 6 in accordance with the pulse generation request signal from the pulse selection control portion 11 and drives the motor 6 in accordance with the P1$_B$ pulse (Step S105).

At a time T2 after the P1$_B$ pulse has been output and the motor 6 has been driven, the pulse selection control portion 11 once again determines the charging/non-charging state of the secondary battery 2 based on the charging detection signal (Step S106, the determination result being the state B). Even at the time T2, it is determined that the secondary battery 2 is in the same non-charging state as at the time T1, so the result of the comparison is that the state A and the state B are the same (Step S107). In this case, it is determined that the charging state of the secondary battery 2 has not changed during the driving of the motor 6, and that the power supply voltage has not changed suddenly, so there is little possibility of causing the motor 6 to malfunction, such as by not rotating or the like. Therefore, the P2 pulse, which is the drive pulse for correcting the time, is forcibly not output in accordance with the pulse generation request signal.

Thereafter, even at the time T3, the pulse selection signal is in the L state, and it is determined that the output voltage of the secondary battery 2 is in a state in which it is lower than the switching point CT, so the pulse selection control portion 11 outputs the pulse generation request signal such that the $P1_B$ pulse will be generated as the drive pulse for the motor 6. Furthermore, because the secondary battery 2 is not being charged, so the charging detection signal continues to be in the H state, and the pulse selection control portion 11 determines that the secondary battery 2 is in the non-charging state (the state A).

After the time T3, the motor drive control portion 5 outputs the $P1_B$ pulse as the drive pulse for the motor 6 and drives the motor 6.

At a time T4 that is after the $P1_B$ pulse has been output and the motor 6 has been driven, the pulse selection control portion 11 once again determines the charging/non-charging state of the secondary battery 2 based on the charging detection signal (the determination result being the state B). At the time T4, the charging state is determined, and unlike at the time T3, the result of the comparison is that the state A and the state B are different. This is because, at a time T11, during the driving of the motor 6 by the $P1_B$ pulse, sunlight started to fall on the solar battery 1, such that the secondary battery 2 changed from the non-charging state to the charging state, and the output voltage of the secondary battery 2 suddenly increased, as shown by W2 in FIG. 6.

In this case, the rapid change in the power supply voltage makes unsuitable the drive pulse (the $P1_B$ pulse), which was selected based on the power supply voltage (at the time T3) before the motor 6 was driven. In addition, the rotation detection technology that was previously described might not function properly. Therefore, there is a strong possibility of causing the motor 6 to malfunction, such as by not rotating or the like. Accordingly, the motor drive device 100 operates such that the P2 pulse, which is the drive pulse for correcting the time, is forcibly supplied to the motor 6. Specifically, the pulse selection control portion 11 outputs the pulse generation request signal to the motor drive control portion 5 such that the P2 pulse will be generated as the drive pulse for the motor 6. Thus, after the time T4, the motor drive control portion 5, as a result of supplying the P2 pulse to the motor 6, rotationally drives the motor 6 and corrects the error in the time that was generated by the non-rotation of the motor 6.

Having gone through the rapid voltage increase after the start of the charging (W2 in FIG. 6), the output voltage (the power supply voltage) of the secondary battery 2 thereafter continues to rise gradually close to a time T5, due to the charging, as shown by W3 in FIG. 6. At this time, the output voltage of the secondary battery 2 is a voltage that is greater than the switching point CT (for example, 1.5 volts).

At the time T5, the output voltage of the secondary battery 2 is a voltage that is greater than the switching point CT, so the pulse selection signal that is output from the battery voltage detection portion 8 is in the H state (Step S101). The pulse selection control portion 11 therefore outputs the pulse generation request signal to the motor drive control portion 5 such that the $P1_A$ pulse will be generated as the drive pulse for the motor 6 (Step S102).

Furthermore, at the time T5, the secondary battery 2 is being charged, so the charging detection signal from the charging detection and reverse current prevention portion 9 is in the L state, and the pulse selection control portion 11 determines that the secondary battery 2 is in the charging state (Step S103). The determination result (the state A) is stored in the memory of the pulse selection control portion 11 (Step S104).

After the time T5, the motor drive control portion 5 outputs the $P1_A$ pulse as the drive pulse for the motor 6, in accordance with the pulse generation request signal from the pulse selection control portion 11, and drives the motor 6 (Step S105).

At a time T6, after the $P1_A$ pulse has been output and the motor 6 has been driven, the pulse selection control portion 11 once again determines the charging/non-charging state of the secondary battery 2 based on the charging detection signal (Step S106, the determination result being the state B). Even at the time T6, it is determined that the secondary battery 2 is in the same charging state as at the time T5, so the result of the comparison is that the state A and the state B are the same (Step S107).

In this case, it is determined that the charging state of the secondary battery 2 has not changed during the driving of the motor 6, and that the power supply voltage has not changed suddenly, so there is little possibility of causing the motor 6 to malfunction, such as by not rotating or the like. Therefore, the P2 pulse is not output in accordance with the pulse generation request signal.

Even at a later time T7, it is determined that the output voltage of the secondary battery 2 is in a state in which it is greater than the switching point CT, so the pulse selection control portion 11 outputs the pulse generation request signal such that the $P1_A$ pulse will be generated as the drive pulse for the motor 6. Furthermore, the charging detection signal continues to be in the L state, so the pulse selection control portion 11 determines that the secondary battery 2 is being charged (the state A).

After the time T7, the motor drive control portion 5 outputs the $P1_A$ pulse as the drive pulse for the motor 6 and drives the motor 6.

At a time T8 that is after the $P1_A$ pulse has been output and the motor 6 has been driven, the pulse selection control portion 11 once again determines the charging/non-charging state of the secondary battery 2 based on the charging detection signal (the determination result being the state B). At the time T8, the non-charging state is determined, and unlike at the time T7, the result of the comparison is that the state A and the state B are different. This is because, at a time T12, during the driving of the motor 6 by the $P1_A$ pulse, sunlight stopped falling on the solar battery 1, such that the secondary battery 2 changed from the charging state to the non-charging state, and the output voltage of the secondary battery 2 suddenly decreased, as shown by W4 in FIG. 6.

In this case, because the power supply voltage has changed suddenly, the drive pulse (the $P1_A$ pulse), which was selected based on the power supply voltage (at the time T7) before the motor 6 was driven, becomes unsuitable. In addition, the rotation detection technology that was previously described might not function properly. Therefore, there is a strong possibility of causing the motor 6 to malfunction, such as by not rotating or the like. Accordingly, the pulse selection control portion 11 outputs the pulse generation request signal to the motor drive control portion 5 such that the P2 pulse, which is the drive pulse for correcting the time, will be generated as the drive pulse for the motor 6. Thus, after the time T8, the motor drive control portion 5, as a result of supplying the P2 pulse to the motor 6, rotationally drives the motor 6 and corrects the error in the time that was generated by the non-rotation of the motor 6.

Furthermore, as indicated by W5 in FIG. 6, the output voltage (the power supply voltage) of the secondary battery 2 gradually decreases from a voltage that is lower than the switching point CT (for example, 1.5 volts), due to the voltage drop that is caused by power consumption, in the same manner as W1 in FIG. 6. Therefore, at W5 in FIG. 6, the pulse selection control portion 11 performs the same sort of processing as at W1 in FIG. 6.

As described above, according to the present embodiment, the pulse selection control portion 11 examines and compares the states of the charging detection signal before and after the driving of the motor 6, that is, before and after the one of the P$1_A$ pulse and the P$1_B$ pulse is supplied to the motor 6. Thus the pulse selection control portion 11 is able to determine whether or not the charging state of the secondary battery 2 has changed during the driving of the motor 6. For example, if the pulse selection control portion 11 monitors the state of the charging detection signal, and if it is clear that the secondary battery 2 was in the non-charging state before the motor 6 was driven, but was in the charging state after the motor 6 was driven, the pulse selection control portion 11 is able to determine that the charging started during the driving of the motor 6. Moreover, if the secondary battery 2 was in the charging state before the motor 6 was driven, but was in the non-charging state after the motor 6 was driven, the pulse selection control portion 11 is able to determine that the charging stopped during the driving of the motor 6.

Furthermore, in the present embodiment, in a case where, during the driving of the motor 6, the charging state changes and the power supply voltage changes suddenly, due to the starting or stopping of the charging of the secondary battery 2, not only does the possibility exist that the drive pulse (one of the P$1_A$, pulse and the P$1_B$ pulse) that was selected based on the power supply voltage before the motor 6 was driven will become unsuitable, but also the rotation detection technology that was previously described might not function properly. Therefore, in a case where the pulse selection control portion 11 has determined that there is a possibility of causing the motor 6 to malfunction, such as by not rotating or the like, the timepiece 200 and the motor drive device 100 forcibly generate the P2 pulse, which is the drive pulse for correcting the time, and rotationally drive the motor 6. Thus, even if the motor 6 does not rotate, due to a sudden fluctuation in the power supply voltage that is caused by a change in the charging state, the timepiece 200 and the motor drive device 100 are able to rotationally drive the motor 6 reliably using the P2 pulse, and are able to correct the error in the time that is caused by the non-rotation of the motor 6. Therefore, even if the charging state of the secondary battery 2 (the secondary power supply portion) changes during the driving of the motor 6 and the power supply voltage changes suddenly, the timepiece 200 and the motor drive device 100 are able to drive the motor 6 reliably.

Note that according to the present embodiment of the present invention, the motor drive device 100 is provided with the charging detection and reverse current prevention portion 9 (the charging detection portion) and the pulse selection control portion 11 (the control portion). The charging detection and reverse current prevention portion 9 detects the charging state of the secondary battery 2 (the secondary power supply portion), which is charged by the electromotive force of the solar battery 1 (the primary power supply portion), the charging state indicating whether or not the secondary battery 2 is being charged. The pulse selection control portion 11 causes the first drive pulse (one of the P$1_A$ pulse and the P$_B$ pulse) to be generated for driving the motor 6, and in a case where the charging states that have been detected by the charging detection and reverse current prevention portion 9 before and after the first drive pulse is output are different, the pulse selection control portion 11 causes the second drive pulse (the P2 pulse) to be generated for driving the motor 6.

Thus the motor drive device 100 is able to drive the motor 6 reliably, even if the charging state of the secondary battery 2 (the secondary power supply portion) changes during the driving of the motor 6 and the power supply voltage changes suddenly.

The second drive pulse is a drive pulse that has a pulse width that is wider than that of the first drive pulse (one of the P$1_A$ pulse and the P$1_B$ pulse). Furthermore, the second drive pulse is a drive pulse (the P2 pulse) that has a pulse width that is necessary and sufficient for rotating the motor 6.

Thus the motor drive device 100 is able to rotate the motor 6 reliably using the second drive pulse (the P2 pulse). Therefore, even if the charging state of the secondary battery 2 changes during the driving of the motor 6 and the power supply voltage changes suddenly, the motor drive device 100 is able to reliably correct the error in the time that was generated by the non-rotation of the motor 6.

The motor drive device 100 is also provided with the battery voltage detection portion 8, which detects the output voltage of the secondary battery 2 (the secondary power supply portion). Then, based on the detection result from the battery voltage detection portion 8, the pulse selection control portion 11 (the control portion) changes the pulse width of the first drive pulse.

Thus the motor drive device 100 is able to set the optimum drive pulse width that is necessary for driving the motor 6, in accordance with the output voltage of the secondary battery 2 (the secondary power supply portion). Therefore, the motor drive device 100 is able to reduce the power that is consumed by the timepiece operation.

In the embodiment that is described above, the primary power supply portion is the solar battery 1.

Because the solar battery 1 is able to convert light energy directly into electric power, it is thus possible to reduce the number of parts in the primary power supply portion.

Furthermore, the timepiece 200 (a timepiece device) is provided with the motor drive device 100.

It can thus be anticipated that the timepiece 200 will have the same effects as the motor drive device 100. That is, even if the charging state of the secondary battery 2 (the secondary power supply portion) changes during the driving of the motor 6 and the power supply voltage changes suddenly, the timepiece 200 is able to drive the motor 6 reliably. The timepiece 200 can also operate the timepiece hands reliably and can measure the time accurately.

Second Embodiment

Next, a different of the present invention will be explained.

In the present embodiment, the configuration of the timepiece 200 and the motor drive device 100 is the same as in the first embodiment that is shown in FIG. 1. In the timepiece 200 and the motor drive device 100 according to the present embodiment, the pulse selection control processing by the pulse selection control portion 11 is different than in the first embodiment that is described above. Hereinafter, the pulse selection control processing according to the present embodiment will be explained.

Figure 7:
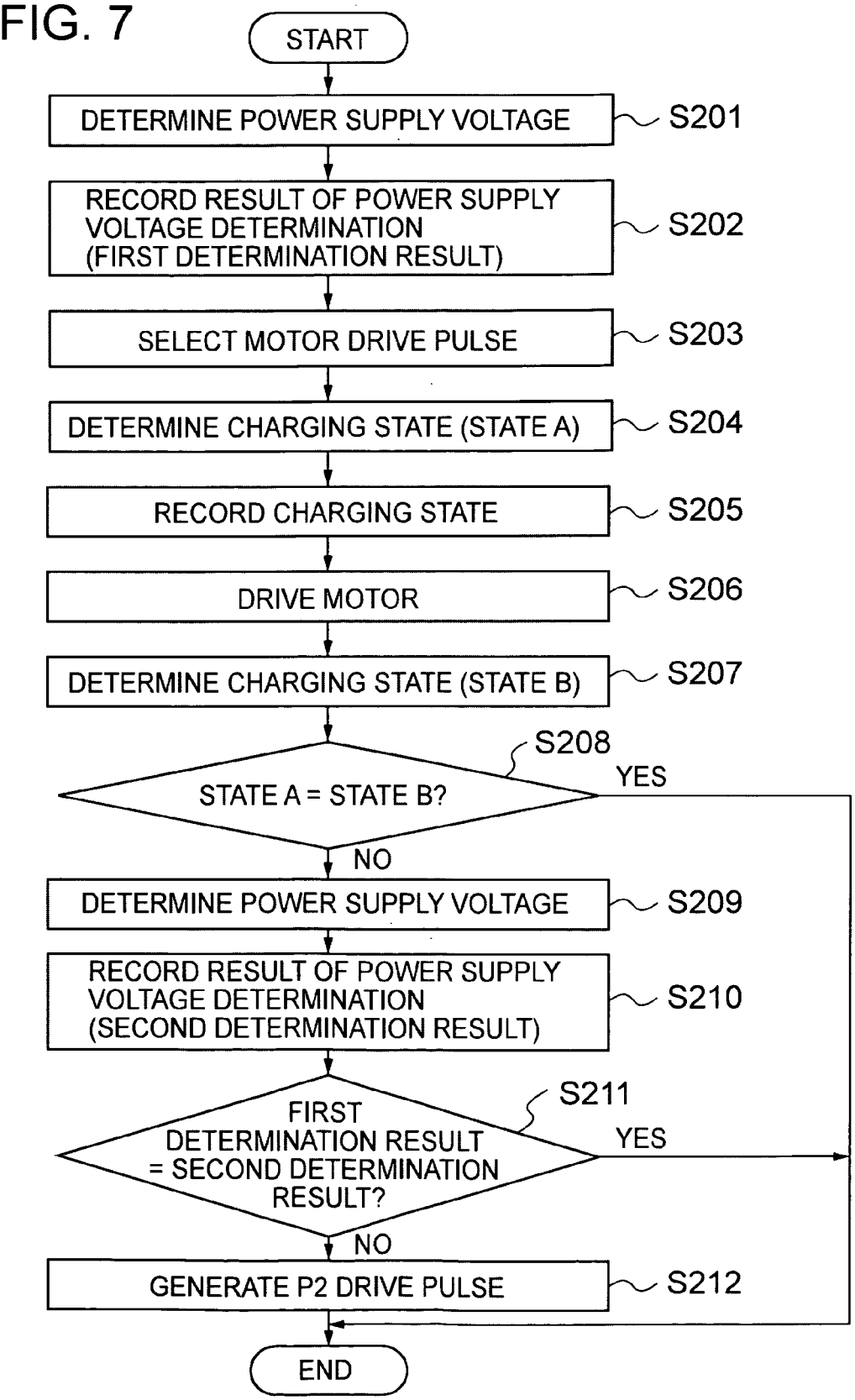
FIG. 7 is a second flowchart that shows a different example of the pulse selection control processing according to the present embodiment.

FIG. 7 is a second flowchart that shows the pulse selection control processing according to the present embodiment.

First, the pulse selection control portion 11 determines whether or not the output voltage of the secondary battery 2 is not less than the switching point CT (for example, 1.5 volts), based on the state (the H state/the L state) of the pulse selection signal that is supplied from the battery voltage detection portion 8 (Step S201). Note that the pulse selection control portion 11 performs the processing at Step S201 based on the drive timing signal that is supplied from the motor drive control portion 5.

Next, the pulse selection control portion 11 stores in memory, as a first determination result, the result of the determination as to whether or not the output voltage of the secondary battery 2 is not less than the switching point CT (for example, 1.5 volts) (a power supply voltage determination result) (Step S202).

Next, based on the determination result at Step S201, the pulse selection control portion 11 selects one of the P1$_A$ pulse and the P1$_B$ pulse as the drive pulse for the motor 6 (Step S203). Specifically, in a case where the output voltage of the secondary battery 2 is not less than 1.5 volts (the state of the pulse selection signal is the H state), the pulse selection control portion 11 outputs the pulse generation request signal to the motor drive control portion 5 such that the P1$_A$ pulse will be generated as the drive pulse for the motor 6. In a case where the output voltage of the secondary battery 2 is less than 1.5 volts (the state of the pulse selection signal is the L state), the pulse selection control portion 11 outputs the pulse generation request signal to the motor drive control portion 5 such that the P1$_B$ pulse will be generated as the drive pulse for the motor 6. In other words, the pulse selection control portion 11 varies the pulse width of the first drive pulse based on the output voltage that is detected by the battery voltage detection portion 8 and on the predetermined switching point CT (for example, 1.5 volts).

Next, the pulse selection control portion 11 determines the charging/non-charging state of the secondary battery 2, based on the state (the H state/the L state) of the charging detection signal that is output from the charging detection and reverse current prevention portion 9 (Step S204). Then the determination result at this time is stored in memory as the state A (Step S205). Thereafter, the motor drive control portion 5 drives the motor 6 by outputting to the motor 6 the one of the P1$_A$ pulse and the P1$_B$ pulse that was selected at Step S203 (Step S206).

After the motor 6 is driven, the pulse selection control portion 11 once again determines the charging/non-charging state of the secondary battery 2, based on the state (the H state/the L state) of the charging detection signal (Step S207). The determination result at this time is defined as the state B. Note that the pulse selection control portion 11 performs the processing at Step S207 after detecting that the motor 6 has been driven based on the pulse completed signal that is supplied from the motor drive control portion 5. In this manner, the pulse selection control portion 11 determines the charging/non-charging state of the secondary battery 2 before and after the driving of the motor 6. Then the pulse selection control portion 11 compares the state A and the state B that are the determination results (Step S208).

If the result of the comparison is that the state A and the state B are the same, the pulse selection control portion 11 terminates the pulse selection control processing, and if the result of the comparison is that the state A and the state B are different, the pulse selection control portion 11 advances the processing to Step S209.

Next, at Step S209, the pulse selection control portion 11 once again determines whether or not the output voltage of the secondary battery 2 is not less than the switching point CT (for example, 1.5 volts), based on the state (the H state/the L state) of the pulse selection signal that is supplied from the battery voltage detection portion 8.

Next, the pulse selection control portion 11 stores in memory, as a second determination result, the result of the determination as to whether or not the output voltage of the secondary battery 2 is not less than the switching point CT (for example, 1.5 volts) (the power supply voltage determination result) (Step S210).

Next, the pulse selection control portion 11 determines whether or not the first determination result that was stored in memory at Step S202 is equal to the second determination result that was stored in memory at Step S210 (Step S211). In a case where the first determination result and the second determination result are different (not equal), the pulse selection control portion 11 advances the processing to Step S212, and in a case where the first determination result and the second determination result are equal, the pulse selection control portion 11 terminates the pulse selection control processing. In other words, in a case where the output voltage that is detected by the battery voltage detection portion 8 does not pass through the predetermined switching point CT (for example, 1.5 volts) during the time from before the first drive pulse is output to after the first drive pulse is output, the pulse selection control portion 11 does not cause the second drive pulse (the P2 pulse) to be generated.

Next, at Step S212, the pulse selection control portion 11 outputs the pulse generation request signal to the motor drive control portion 5 such that the P2 pulse will be generated as the drive pulse for the motor 6, and the pulse selection control processing is terminated.

Next, the pulse selection control according to the present embodiment, as the state of the timepiece 200 passes from a voltage drop due to power consumption, through a voltage increase due to the charging, to another voltage drop due to power consumption, will be explained with reference to FIGS. 8 to 10.

Figure 8:
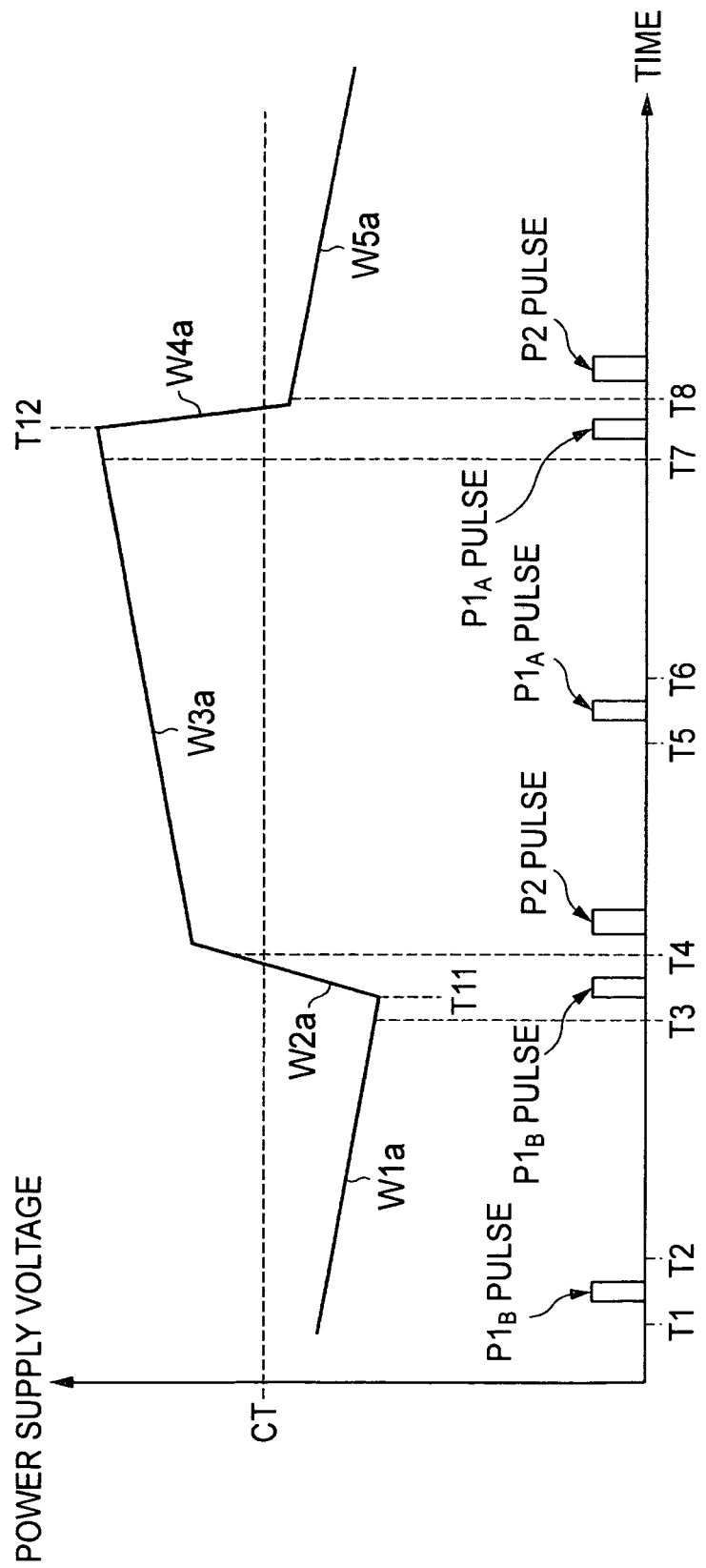
FIG. 8 is a second timing chart that shows a different example of the operation of the pulse selection control according to the present embodiment.

FIG. 8 is a second timing chart that shows an example of the operation of the pulse selection control according to the present embodiment. Note that in FIG. 8, the horizontal axis indicates the time, and the vertical axis indicates the power supply voltage, in the same manner as in FIG. 6. Further, the P1$_A$ pulse and the P1$_B$ pulse that are shown in FIG. 8 are supplied to the motor 6 once per second.

Note also that FIG. 8 will be used to explain the processing in a case where the output voltage does pass through the predetermined switching point CT (for example, 1.5 volts) during the time from before the first drive pulse is output to after the first drive pulse is output.

First, at W1a, W3a, and W5a in FIG. 8, the charging states before and after the first drive pulse is output are equal (the state A equals the state B), so as shown at Step S208 in FIG. 7, after the first drive pulse (one of the P1$_A$ pulse and the P1$_B$ pulse) is output, the pulse selection control portion 11 does not cause the motor drive control portion 5 to generate the second drive pulse (the P2 pulse).

Next, the operation of the pulse selection control processing will be explained in a case where the output voltage of the secondary battery 2 shifts, from a time T3 to a time T4, from a state of being less than the switching point CT to a state of being greater than the switching point CT.

In this case, at the time T3, the output voltage of the secondary battery 2 is less than the switching point CT (for example, 1.5 volts), so the pulse selection control portion 11 causes the motor drive control portion 5 to output (generate) the $P1_B$ pulse as the first drive pulse. Here, the charging state at the time T3 (the state A) and the charging state at the time T4 (the state B) are different states, so the pulse selection control portion 11 determines that the state A and the state B are different (Step S208) and once again performs the determining of the output voltage of the secondary battery 2 (Step S209). Furthermore, in this case, the output voltage of the secondary battery 2 changes such that it passes through the switching point CT between the time T3 and the time T4, as shown by W2a in FIG. 8, so the pulse selection control portion 11 determines that the first determination result and the second determination result are different (Step S211). Therefore, the pulse selection control portion 11 causes the motor drive control portion 5 to output (generate) the second drive pulse (the P2 pulse) (Step S212).

Next, the operation of the pulse selection control processing will be explained in a case where the output voltage of the secondary battery 2 shifts, from a time T7 to a time T8, from a state of being greater than the switching point CT to a state of being less than the switching point CT.

In this case, at the time T7, the output voltage of the secondary battery 2 is not less than the switching point CT (for example, 1.5 volts), so the pulse selection control portion 11 causes the motor drive control portion 5 to output (generate) the $P1_A$ pulse as the first drive pulse. Here, the charging state at the time T7 (the state A) and the charging state at the time T8 (the state B) are different states, so the pulse selection control portion 11 determines that the state A and the state B are different (Step S208) and once again performs the determining of the output voltage of the secondary battery 2 (Step S209). Furthermore, in this case, the output voltage of the secondary battery 2 changes such that it passes through the switching point CT between the time T7 and the time T8, as shown by W4a in FIG. 8, so the pulse selection control portion 11 determines that the first determination result and the second determination result are different (Step S211). Therefore, the pulse selection control portion 11 causes the motor drive control portion 5 to output (generate) the second drive pulse (the P2 pulse) (Step S212).

Figure 9:
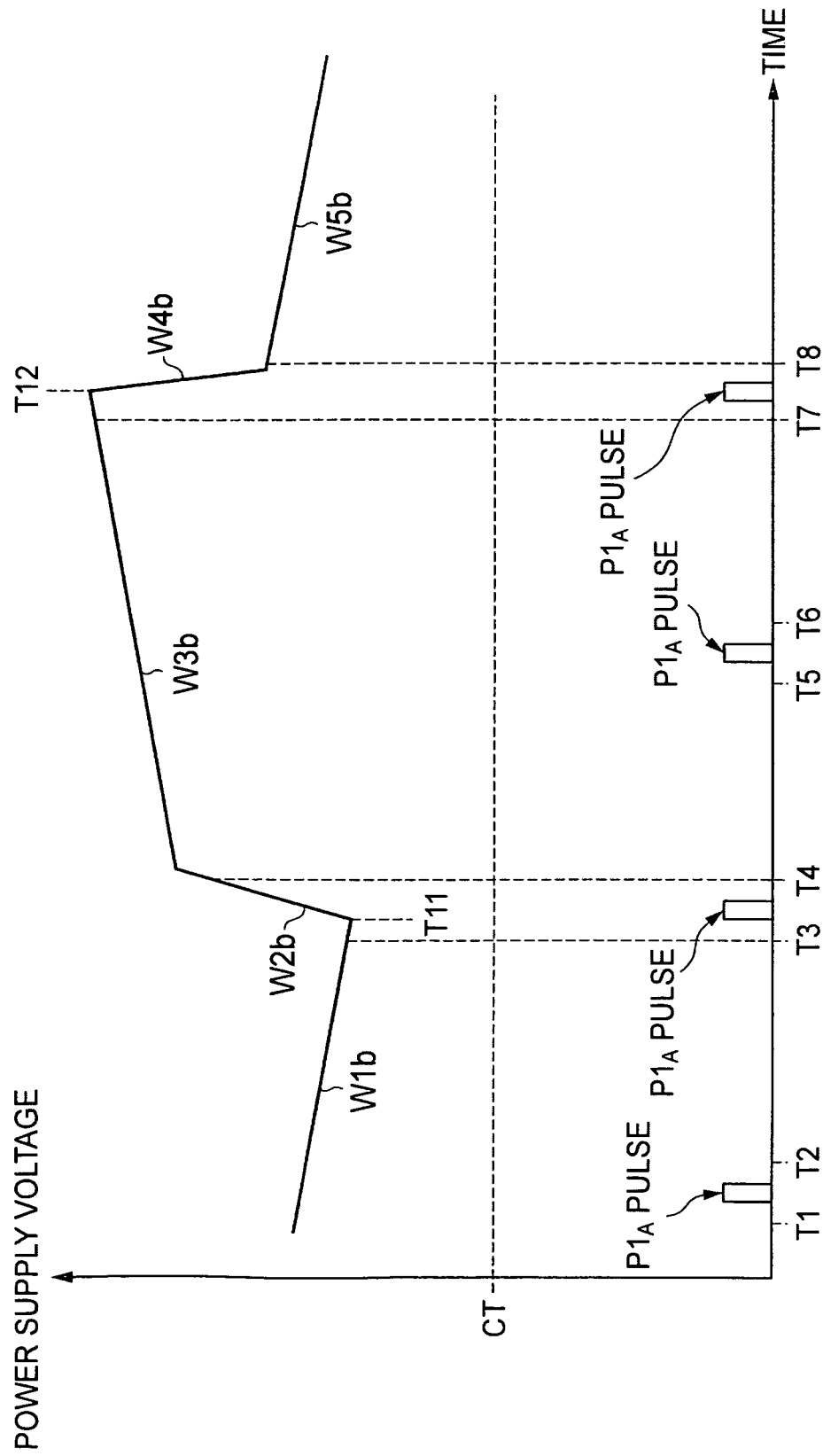
FIG. 9 is a third timing chart that shows a different example of the operation of the pulse selection control according to the present embodiment.

FIG. 9 is a third timing chart that shows a different example of the operation of the pulse selection control according to the present embodiment. Note that in FIG. 9, the horizontal axis indicates the time, and the vertical axis indicates the power supply voltage, in the same manner as in FIG. 8. Further, the first drive pulse (the $P1_A$ pulse) that is shown in FIG. 9 is supplied to the motor 6 once per second.

FIG. 9 will be used to explain the processing in a case where the output voltage of the secondary battery 2 is greater than the predetermined switching point CT (for example, 1.5 volts) and does not pass through the predetermined switching point CT during the time from before the first drive pulse is output to after the first drive pulse is output, as shown by W1b to W5b.

From W1b to W5b in FIG. 9, the output voltage of the secondary battery 2 is greater than the switching point CT that is described above, so the pulse selection control portion 11 causes the motor drive control portion 5 to output (generate) the $P1_A$ pulse as the first drive pulse. In this case, the output voltage of the secondary battery 2 does not pass through the predetermined switching point CT during the time from before the first drive pulse (the $P1_A$ pulse) is output to after the first drive pulse is output, so the pulse selection control portion 11 does not cause the motor drive control portion 5 to generate the second drive pulse (the P2 pulse).

For example, from a time T3 to a time T4 in FIG. 9, the charging state at the time T3 (the state A) and the charging state at the time T4 (the state B) are different states, so the pulse selection control portion 11 determines that the state A and the state B are different (Step S208) and once again performs the determining of the output voltage of the secondary battery 2 (Step S209). However, in this case, as shown by W2b in FIG. 9, the output voltage of the secondary battery 2 does not change between the time T3 and the time T4 such that it passes through the switching point CT, so the pulse selection control portion 11 determines that the first determination result and the second determination result are equal (Step S211). Therefore, the pulse selection control portion 11 does not cause the motor drive control portion 5 to output (generate) the second drive pulse (the P2 pulse).

In the same manner, from a time T7 to a time T8 in FIG. 9, for example, the charging state at the time T7 (the state A) and the charging state at the time T8 (the state B) are different states, so the pulse selection control portion 11 determines that the state A and the state B are different (Step S208) and once again performs the determining of the output voltage of the secondary battery 2 (Step S209). However, in this case, as shown by W4b in FIG. 9, the output voltage of the secondary battery 2 does not change between the time T7 and the time T8 such that it passes through the switching point CT, so the pulse selection control portion 11 determines that the first determination result and the second determination result are equal (Step S211). Therefore, the pulse selection control portion 11 does not cause the motor drive control portion 5 to output (generate) the second drive pulse (the P2 pulse).

Figure 10:
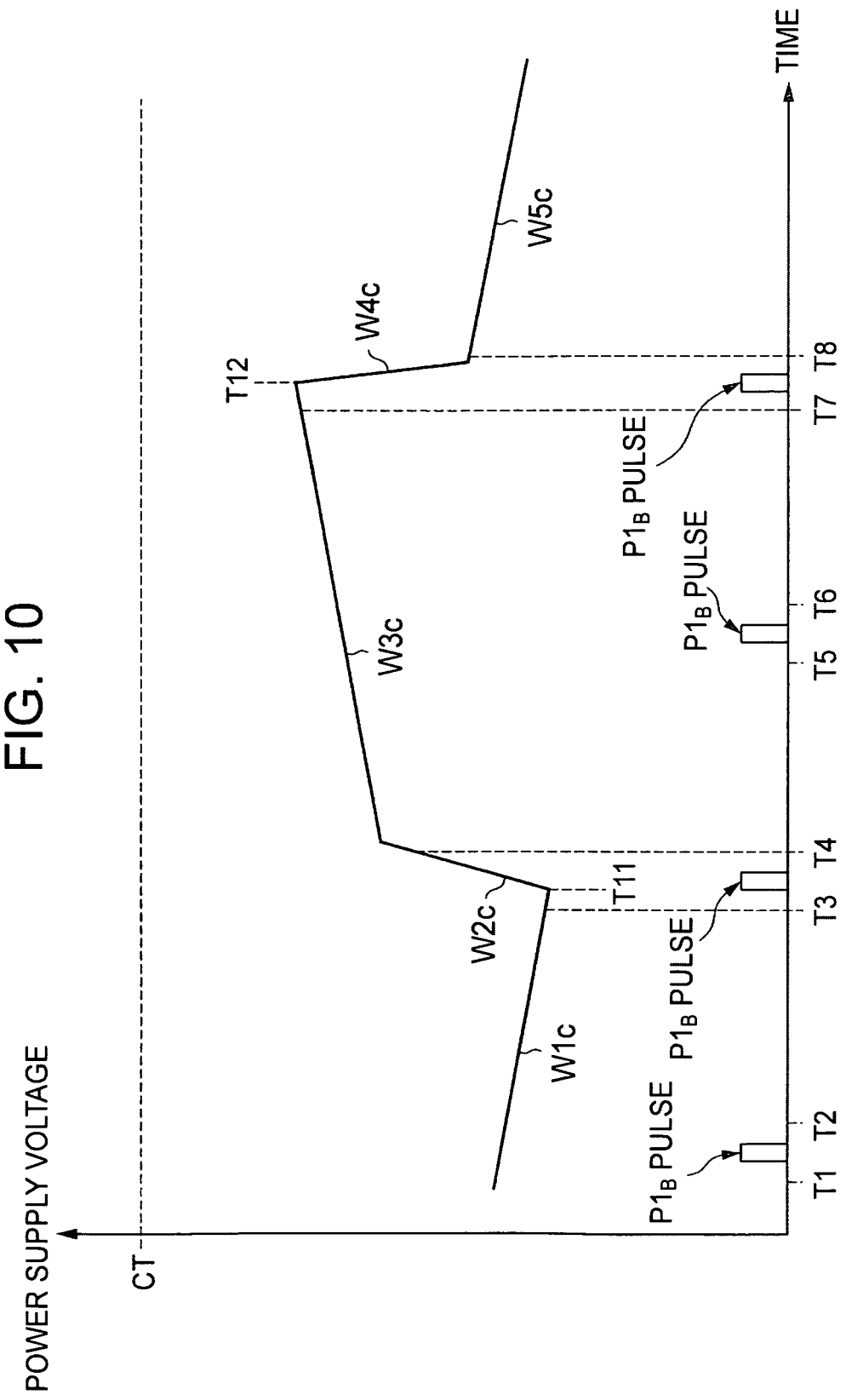
FIG. 10 is a fourth timing chart that shows a different example of the operation of the pulse selection control according to the present embodiment.

FIG. 10 is a fourth timing chart that shows a different example of the operation of the pulse selection control according to the present embodiment. Note that in FIG. 10, the horizontal axis indicates the time, and the vertical axis indicates the power supply voltage, in the same manner as in FIGS. 8 and 9. Further, the first drive pulse (the $P1_B$ pulse) that is shown in FIG. 10 is supplied to the motor 6 once per second.

FIG. 10 will be used to explain the processing in a case where the output voltage of the secondary battery 2 is less than the predetermined switching point CT (for example, 1.5 volts) and does not pass through the predetermined switching point CT during the time from before the first drive pulse is output to after the first drive pulse is output, as shown by W1c to W5c.

From W1c to W5c in FIG. 10, the output voltage of the secondary battery 2 is less than the switching point CT that is described above, so the pulse selection control portion 11 causes the motor drive control portion 5 to output (generate) the $P1_B$ pulse as the first drive pulse. In this case, the output voltage of the secondary battery 2 does not pass through the predetermined switching point CT during the time from before the first drive pulse (the $P1_B$ pulse) is output to after the first drive pulse is output, so the pulse selection control portion 11 does not cause the motor drive control portion 5 to generate the second drive pulse (the P2 pulse).

For example, from a time T3 to a time T4 in FIG. 10, the charging state at the time T3 (the state A) and the charging state at the time T4 (the state B) are different states, so the pulse selection control portion 11 determines that the state A and the state B are different (Step S208) and once again performs the determining of the output voltage of the secondary battery 2 (Step S209). However, in this case, as shown by W2c in FIG. 10, the output voltage of the secondary battery 2 does not change between the time T3 and the time T4 such that it passes through the switching point CT, so the pulse selection control portion 11 determines that the first determination result and the second determination result are equal (Step S211). Therefore, the pulse selection control portion 11 does not cause the motor drive control portion 5 to output (generate) the second drive pulse (the P2 pulse).

In the same manner, from a time T7 to a time T8 in FIG. 10, for example, the charging state at the time T7 (the state A) and the charging state at the time T8 (the state B) are different states, so the pulse selection control portion 11 determines that the state A and the state B are different (Step S208) and once again performs the determining of the output voltage of the secondary battery 2 (Step S209). However, in this case, as shown by W4c in FIG. 10, the output voltage of the secondary battery 2 does not change between the time T7 and the time T8 such that it passes through the switching point CT, so the pulse selection control portion 11 determines that the first determination result and the second determination result are equal (Step S211). Therefore, the pulse selection control portion 11 does not cause the motor drive control portion 5 to output (generate) the second drive pulse (the P2 pulse).

As described above, according to the present embodiment the pulse selection control portion 11 varies the pulse width of the first drive pulse based on the output voltage of the secondary battery 2 that is detected by the battery voltage detection portion 8 and on the predetermined switching point CT. Then, in a case where the charging states before and after the first drive pulse is output are different, and the output voltage of the secondary battery 2 passes through the switching point CT during the time from before the first drive pulse is output to after the first drive pulse is output, the pulse selection control portion 11 causes the motor drive control portion 5 to output (generate) the second drive pulse (the P2 pulse). Furthermore, in a case where the output voltage of the secondary battery 2 that is detected by the battery voltage detection portion 8 does not pass through the predetermined switching point CT during the time from before the first drive pulse is output to after the first drive pulse is output, the pulse selection control portion 11 does not cause the motor drive control portion 5 to output (generate) the second drive pulse (the P2 pulse).

That is, in a case where the output voltage of the secondary battery 2 passes through the switching point CT during the time from before the first drive pulse is output to after the first drive pulse is output, the possibility exists that the first drive pulse will not be output with an appropriate pulse width. In other words, in this case, there is a possibility that a drive error will occur in the motor 6. Thereafter, in this case, the pulse selection control portion 11 causes the motor drive control portion 5 to output (generate) the second drive pulse (the P2 pulse). The timepiece 200 and the motor drive device 100 are thus able to rotationally drive the motor 6 reliably using the P2 pulse, making it possible to correct the error in the time that was generated by the non-rotation of the motor 6. Therefore, even if the charging state of the secondary battery 2 (the secondary power supply portion) changes during the driving of the motor 6 and the power supply voltage changes suddenly, the timepiece 200 and the motor drive device 100 are able to drive the motor 6 reliably.

Furthermore, in a case where the output voltage of the secondary battery 2 does not pass through the switching point CT during the time from before the first drive pulse is output to after the first drive pulse is output, it is not necessary to modify the pulse width of the first drive pulse, so the first drive pulse is output with an appropriate pulse width. Therefore, in this case, the pulse selection control portion 11 does not cause the motor drive control portion 5 to output (generate) the second drive pulse (the P2 pulse). The timepiece 200 and the motor drive device 100 are thus able to suppress the generating of a useless P2 pulse, making it possible to reduce the electric current that is consumed.

Embodiments of the present invention have been explained above, but the present invention is not limited to these embodiments, and modifications can be made within the scope of the claims. Examples of such modifications will be described below.

In the embodiments that are described above, a configuration was explained that uses the solar battery 1 for the primary power supply portion, but a configuration that uses a different primary power supply portion may also be used. For example, a configuration may be used that uses for the primary power supply portion an electricity generating device that converts kinetic energy into electrical energy by electromagnetic induction.

In the embodiments that are described above, a configuration was explained that uses the secondary battery 2 for the secondary power supply portion, but a configuration that uses a condenser may also be used. In the embodiments that are described above, a configuration was explained in which the power supply line VDD is the VDD ground that indicates the reference potential of the entire timepiece 200, but a configuration may also be used in which the power supply line VSS is a VSS ground that indicates the reference potential of the entire timepiece 200.

In each of the embodiments that are described above, a configuration was explained in which the charging detection and reverse current prevention portion 9 is positioned between the negative terminal of the secondary battery 2 and the negative terminal of the solar battery 1, but a configuration may also be used in which the charging detection and reverse current prevention portion 9 is positioned between the positive terminal of the secondary battery 2 and the positive terminal of the solar battery 1. In other words, the charging detection and reverse current prevention portion 9 may be put into a non-conductive state between the positive terminal of the secondary battery 2 and the positive terminal of the solar battery 1 in a case where the charging of the secondary battery 2 stops.

In the embodiments that are described above, each of the oscillation control portion 3, the crystal oscillator 4, the motor drive control portion 5, the battery voltage detection portion 8, the charging detection and reverse current prevention portion 9, the consumed power control portion 10, the pulse selection control portion 11, and the overcharging protection portion 12 in the timepiece 200 may be implemented by dedicated hardware and may also be configured from a memory and a central processing unit (CPU), and each of the functions that are described above may be implemented by a program. Each of the portions described above may also be implemented as an integrated circuit (IC).

In the embodiments that are described above, a configuration was explained that, in accordance with the voltage of the secondary battery 2, switches between the two types of pulse widths, the $P1_A$ pulse and the $P1_B$ pulse, for the first drive pulse, but the present invention is not limited to this configuration. For example, a configuration may also be used that switches among not less than three types of pulse widths for the first drive pulse, in accordance with the voltage of the secondary battery 2, and a configuration may also be used that uses one type of pulse width for the first drive pulse.

In the embodiments that are described above, a configuration was explained in which the consumed power control portion 10 is provided with the pulse selection control portion 11, but the present invention is not limited to this configuration, and a configuration in which the motor drive control portion 5 is provided with the pulse selection control portion 11 may also be used, for example. A configuration was also explained in which the motor drive control portion 5 outputs the pulse completed signal in order to inform the pulse selection control portion 11 that the first drive pulse has been output, but a different configuration may also be used. For example, a configuration may be used in which the pulse completed signal is not used in a case where the drive pulse is output from the motor drive control portion 5 at a predetermined timing after the pulse selection control portion 11 has output the pulse generation request signal.

Note that the timepiece 200 that is described above has an internal computer system. Furthermore, the process of the pulse selection control processing that is described above is stored in the form of a program in a computer-readable storage medium, and the processing is performed by having the computer read and execute the program. Here, the term "computer-readable storage medium" refers to a magnetic disk, a magneto-optical disk, a CD-ROM, a DVD-ROM, a semiconductor memory, or the like. The computer program may be provided to the computer by a communication circuit, and the computer that receives the program may execute it.

The embodiments of the present invention have been explained using a timepiece device as an example, but the present invention is not limited to being a timepiece device, and it can be used effectively in any electronic device that is provided with a solar battery (a primary power supply portion), a secondary battery (a secondary power supply portion), and a motor.

What is claimed is:

1. A motor drive device, comprising:
   a charging detection portion that detects a charging state of a secondary power supply portion that is charged by an electromotive force of a primary power supply portion, the charging state indicating whether the secondary power supply portion is being charged; and
   a control portion that causes a first drive pulse for driving a motor to be generated and that, in a case where the charging state that is detected by the charging detection portion is different after the first drive pulse has been output from what it was before the first drive pulse was output, causes a second drive pulse for driving the motor to be generated.

2. The motor drive device according to claim 1,
   wherein the second drive pulse is a drive pulse that has a wider pulse width than does the first drive pulse.

3. The motor drive device according to claim 2,
   wherein the second drive pulse is a drive pulse that has a pulse width that is necessary and sufficient for rotating the motor.

4. The motor drive device according to claim 3, further comprising:
   a battery voltage detection portion that detects an output voltage of the secondary power supply portion,
   wherein the control portion modifies the pulse width of the first drive pulse based on a detection result from the battery voltage detection portion.

5. The motor drive device according to claim 4,
   wherein the control portion modifies the pulse width of the first drive pulse based on the output voltage that is detected by the battery voltage detection portion and on a predetermined switching point, and
   the control portion does not cause the second drive pulse to be generated in a case where the output voltage that is detected by the battery voltage detection portion does not pass through the predetermined switching point during the time from before the first drive pulse is output to after the first drive pulse is output.

6. The motor drive device according to claim 5,
   wherein the primary power supply portion is a solar battery.

7. The motor drive device according to claim 4,
   wherein the primary power supply portion is a solar battery.

8. The motor drive device according to claim 3,
   wherein the primary power supply portion is a solar battery.

9. The motor drive device according to claim 2, further comprising:
   a battery voltage detection portion that detects an output voltage of the secondary power supply portion,
   wherein the control portion modifies the pulse width of the first drive pulse based on a detection result from the battery voltage detection portion.

10. The motor drive device according to claim 9,
    wherein the control portion modifies the pulse width of the first drive pulse based on the output voltage that is detected by the battery voltage detection portion and on a predetermined switching point, and
    the control portion does not cause the second drive pulse to be generated in a case where the output voltage that is detected by the battery voltage detection portion does not pass through the predetermined switching point during the time from before the first drive pulse is output to after the first drive pulse is output.

11. The motor drive device according to claim 10,
    wherein the primary power supply portion is a solar battery.

12. The motor drive device according to claim 9,
    wherein the primary power supply portion is a solar battery.

13. The motor drive device according to claim 2,
    wherein the primary power supply portion is a solar battery.

14. The motor drive device according to claim 1, further comprising:
    a battery voltage detection portion that detects an output voltage of the secondary power supply portion,
    wherein the control portion modifies the pulse width of the first drive pulse based on a detection result from the battery voltage detection portion.

15. The motor drive device according to claim 14,
    wherein the control portion modifies the pulse width of the first drive pulse based on the output voltage that is detected by the battery voltage detection portion and on a predetermined switching point, and
    the control portion does not cause the second drive pulse to be generated in a case where the output voltage that is detected by the battery voltage detection portion does not pass through the predetermined switching point during the time from before the first drive pulse is output to after the first drive pulse is output.

16. The motor drive device according to claim 7,
    wherein the primary power supply portion is a solar battery.

17. The motor drive device according to claim 14,
    wherein the primary power supply portion is a solar battery.

18. The motor drive device according to claim 1,
    wherein the primary power supply portion is a solar battery.

19. A timepiece device, comprising:
    a motor drive device that is described in claim 1.

20. An electronic device, comprising:
    a motor drive device that is described in claim 1.

* * * * *